ANNIE LODOR.
PORTABLE STOVE.

No. 185,246. Patented Dec. 12, 1876.

Witnesses
Chas. H. Smith
Harold Serrell

Inventor
Annie Lodor
per L. W. Serrell
atty

THE GRAPHIC CO. N.Y.

UNITED STATES PATENT OFFICE.

ANNIE LODOR, OF TRENTON, NEW JERSEY.

IMPROVEMENT IN PORTABLE STOVES.

Specification forming part of Letters Patent No. 185,246, dated December 12, 1876; application filed June 6, 1876.

*To all whom it may concern:*

Be it known that I, ANNIE LODOR, of Trenton, in the State of New Jersey, have invented an Improved Portable Stove, of which the following is a specification:

The object of this invention is to furnish a cooking apparatus that is adapted to being carried in the pocket or in a bag or valise, and can be used by travelers or tourists, especially for making tea or coffee, or for boiling or cooking eggs.

Figure 1:
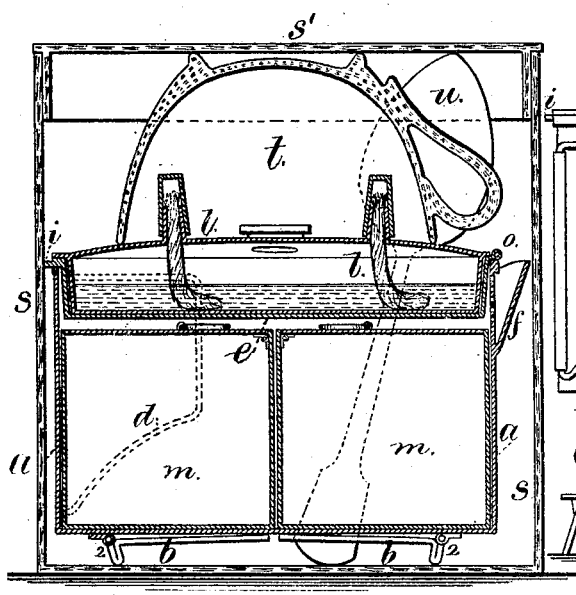
Figure 3:
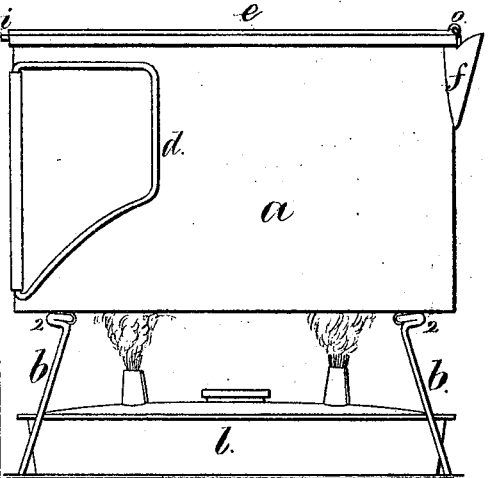
Figure 2:
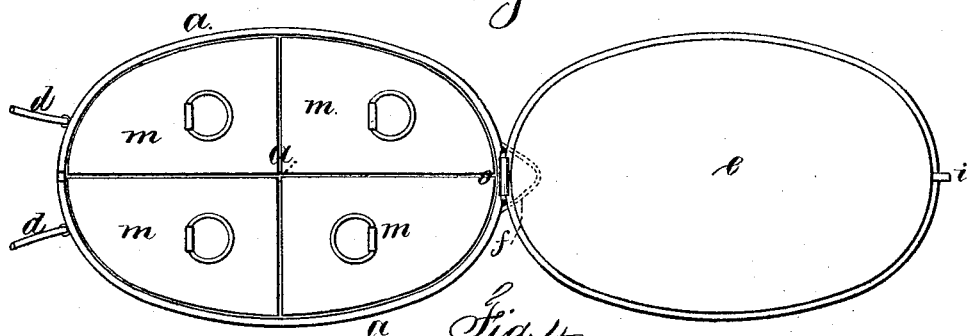
Figure 4:
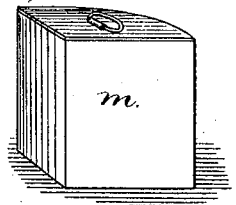

In the drawing, Figure 1 represents, by a section, the apparatus in a packed condition for transportation. Fig. 2 is a plan of the pot with the lid thrown back. Fig. 3 is an elevation of the pot as in use; and Fig. 4 is a perspective view of one of the cans for containing sugar, coffee, tea, or milk.

The pot $a$ is preferably of an elliptical form, with legs $b$, that fold up against the bottom when not in use, said legs being of wire with stop knee-bends 2, and passing through sheet-metal loops soldered upon the bottom of the pot, and in which loops the wires turn as the legs are swung.

The handles $d$ are made to swing open for use, or to fold tightly against the sides of the pot. The wire of each handle passes through a sheet-metal loop soldered to one end of the pot, so as to be convenient in lifting and holding the pot.

The cover $e$ is made in the shape of a pan, that fits inside the upper end of the pot, and is hinged at the end $o$ opposite to the handles $d$, and there is a small thumb-stud at $i$, by which the cover can be kept closed in pouring the contents from a spout, $f$, that is contiguous to the hinge $o$.

This cover $e$, being in the shape of a pan, can be used for cooking an egg, or for any similar purpose, either by the heat of the water in the pot, or by the direct action of the lamp-flame.

The heat is obtained from the spirit-lamp $l$, that is made of a size and shape to set within the pan or cover $e$ when the apparatus is packed, as seen in Fig. 1; but when in use said lamp is placed beneath the pot to heat the same, as seen in Fig. 3.

Within the pot are cans $m$, each of which is provided with a cover, as seen in Fig. 4. The cans are of a size and shape adapted to fit within the pot, as seen in Fig. 2.

It is preferable to make these cans similar to each other, so that the divisions come on the lines of the primitive and conjugate diameters of the ellipse.

A case is adapted to contain the apparatus when packed closely together. This case is preferably of thick paper, as shown at $s$, with a cover, $s'$, and it should be large enough to contain the cup $t$ and a spoon, $u$. (See Fig. 1.)

I claim as my invention—

1. The pot $a$, having folding legs $b$ and a dish-shaped cover, $e$, in combination with the lamp $l$, that fits into the cover, as set forth.

2. The pot $a$, having folding legs $b$, folding handles $d$, a hinged cover, $e$, and a spout, $f$, in combination with the cans $m$, that fit into the pot and are removable therefrom, substantially as set forth.

Signed by me this 29th day of May, A. D. 1876.

ANNIE LODOR.

Witnesses:
 HARRY C. FREESE,
 WALTER I. COOK.